April 4, 1939.  H. ROSENTHAL  2,152,664
OIL TREATING PROCESS
Filed Aug. 4, 1934   4 Sheets-Sheet 1

FIGURE 1

Henry Rosenthal
INVENTOR

FIGURE 4

April 4, 1939. H. ROSENTHAL 2,152,664
OIL TREATING PROCESS
Filed Aug. 4, 1934 4 Sheets-Sheet 4

Patented Apr. 4, 1939

2,152,664

UNITED STATES PATENT OFFICE 2,152,664

OIL TREATING PROCESS

Henry Rosenthal, New York, N. Y.

Application August 4, 1934, Serial No. 738,399

8 Claims. (Cl. 87—6)

My invention relates to the continuous extraction of soluble material from solid matter. It is particularly related to the extraction of fat and oil by the use in the liquid phase of low boiling hydrocarbons as solvent. However, I do not limit my invention to this particular use as certain features are more broadly applicable.

My invention provides a novel form of extractor, a novel means of removing solvent from the spent material and a novel means of removing solvent from the solution, and extraction products of high quality.

In the extraction of oil by solvent, the amount of solvent required to effect substantially complete extraction depends upon the form of extractor and the method of extraction employed. During the extraction process an equilibrium exists between the oil in the solution and the oil in the solid material with which the solution is in immediate contact. To obtain efficient operation, therefore, it is necessary to move the solution in a counter-current direction to the movement of the solid material in order that the fresh solvent contact the solid from which most of the oil has been removed. Furthermore, where the solution has specific gravity in excess of that of the solvent, the solution will tend to fall through the solvent so that the highest concentration of the solute will be at the bottom and the least concentration at the top of the solution. In order, therefore, to comply with the requirement of the spent solid contacting the least concentrated solution, it is desirable that the solvent generally move downward and that the solid generally move upward through the extract, and it is especially desirable that this general relation of movements take place as the solid is brought out of contact with the solution. It is further necessary that the movement of the solid in the extractor be so regulated that the bed of solid in the extractor is not disturbed in such a way as to cause a compaction of material which will prevent a free flow of the solvent into the solid and of the solution out of the solid. I provide apparatus for and methods of achieving these results as will be fully described in this specification.

As the solid material leaves the extraction zone, it of course carries with it portions of the solution held by capillary attraction, absorption and entrainment. It is necessary to remove this solution from the spent solid for the purpose both of recovering the solvent and of recovering the spent material in suitable form. With such solvents as the low boiling hydrocarbons, I have discovered that it is advantageous to remove traces of the solvent from the spent meal prior to discharge of the meal from the extractor. In this way, any risk from fire is greatly reduced as solvent vapors are not discharged from the meal to the atmosphere.

Moreover, I have found that it is desirable to separate from the discharged meal as much solvent as possible in the liquid form, as this requires the minimum expenditure of energy in recovering the solvent. Furthermore, it is desirable that after the maximum amount of solvent has been removed from the meal as liquid, further amounts be removed as vapor at such pressures that the vapors can be condensed by the application of the minimum amount of compression. It will then be necessary as a further step to reduce the pressure of the vapor in contact with the meal after the solvent has been substantially vaporized in order to remove substantially all of the vapors. It is also found desirable that the temperature applied to the meal be limited in order to prevent deterioration of the meal.

My invention provides apparatus for and methods of accomplishing these results that will be more fully described.

The extraction of oil seeds and other materials requires that these materials be reduced to a meal in order that the solvent can penetrate to the oil cells. This meal contains finely pulverized particles. The solution on removal from the solid material often carries with it quantities of these particles, some of which may be in a substantially colloidal condition. This suspended material, if left in the solution for any appreciable time, often causes the end product to deteriorate. Furthermore, many of the oils are very viscous and difficult to filter if the solvent is removed prior to the separation of the suspended material, which is often of a mucous or gelatinous character. I, therefore, provide a novel method comprising filtering the solution immediately upon its discharge from the extractor. To this end, I add to the solution prior to its discharge, such materials as diatomaceous earth or other filter aid, where such is necessary, to assist in the removal of the suspended material which now may be easily filtered therefrom.

In the removal of the solvent from the solution by distillation, I have discovered that pressure should be maintained at a sufficiently high value to effect the subsequent condensation of the solvent with a minimum of compression.

In the preparation of an edible oil, it is essential that all traces of solvent be removed from the product. Even with such solvents as propane and butane, which are gases under normal temperature and atmospheric pressure, care is necessary in order that the final traces of solvent be eliminated, as the extraction of the oil from the solid depends upon the mutual solubility of the oil and the solvent, and this mutual solubility of the materials acts to prevent the ready removal of the solvent from the oil product. Furthermore, the application of high temperatures to effect this separation in many cases causes a deterioration of the oil as the high temperature tends to produce undesirable color and to produce a dark colored oil. The proper handling of the solution will act to produce a product with desirable color characteristics. Furthermore, many oils upon distillation tend to produce froth or foam when the oil content of the solution becomes sufficiently concentrated. This is especially true when small amounts of water are present. This frothing or foaming, unless properly provided for, prevents proper separation and acts to cause contamination of the condensed solvent. My invention provides a novel method of and means for efficiently separating the solvent and the product from the solution. The objects of my invention are thus 1. To provide an efficient extraction.
2. To provide an extractor operable at other than atmospheric pressure.
3. To provide an efficient means for removing solvent from the extracted meal.
4. To provide an extracted meal of high quality.
5. To provide an efficient means for removing solvents from the solution.
6. To provide an oil of high quality.
7. To provide methods of accomplishing the above objects continuously and uninterruptedly.

Other objects of my invention will be apparent from these specifications.

My invention will now be described in further detail by reference to the accompanying drawings which are part of these specifications. In these drawings.

Figure 1:
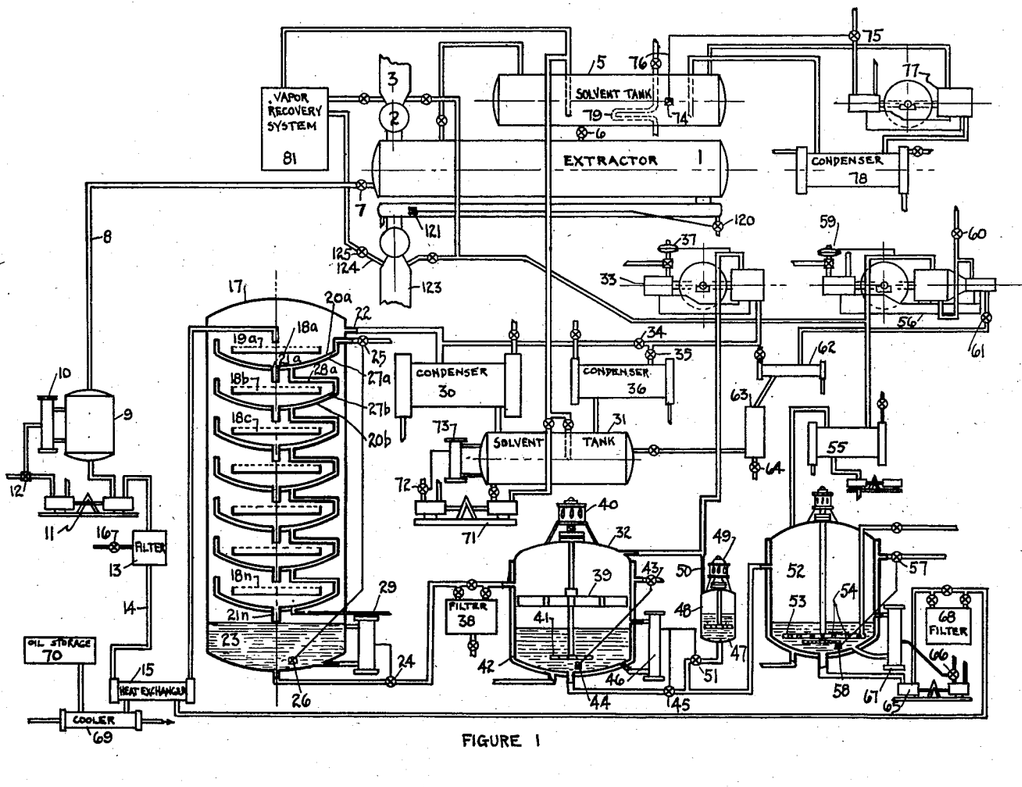
Figure 1 is a diagrammatic layout of one embodiment of my invention.
Figures 2, 3:
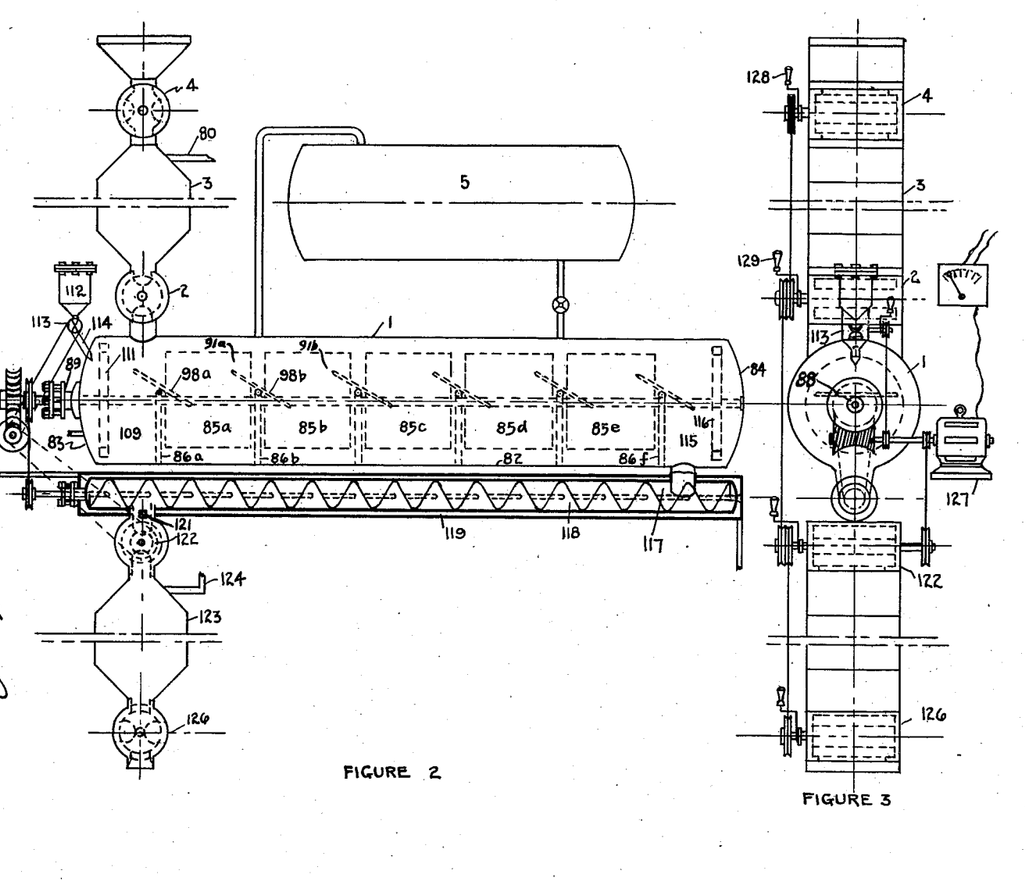
Figure 2 is an elevation of one form of my extractor.
Figure 3 is an end elevation of Figure 2, looking from the left.
Figure 4:
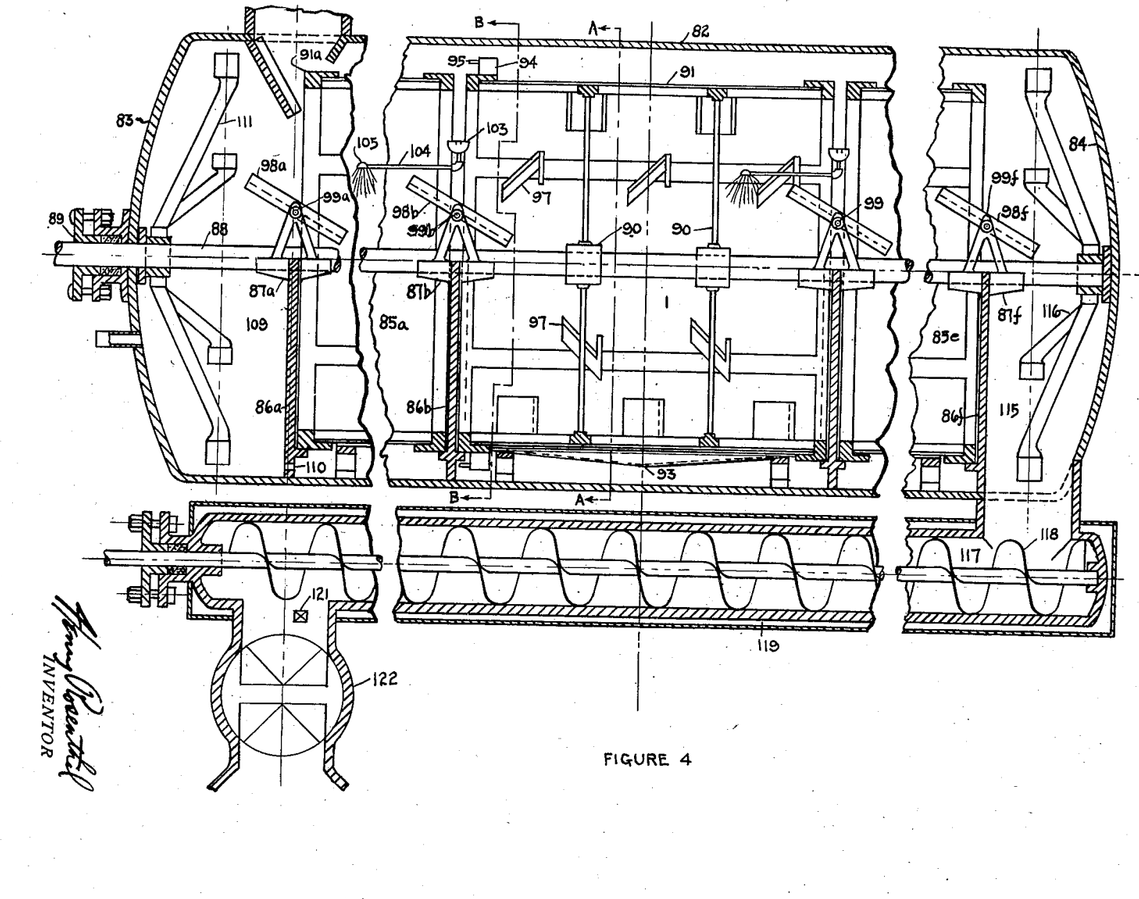
Figure 4 is an enlargement of portions of Figure 2 showing certain details.

Referring to Figure 1, the solid material to be extracted is fed into extractor 1 through rotary valve 2 from feed compartment 3 which is sealed to the atmosphere by the rotary valve 4 (see Figure 2). The solvent is contained in the solvent storage tank 5 and is fed to the extractor 1 through the solvent feed valve 6. The solution leaves the extractor through the discharge valve 7 and then passes by pipe 8 to the equalizing tank 9, equipped with level control 10. The solution is withdrawn from the equalizing tank 9 by the steam pump 11, the supply of power of which is controlled by the level control 10. Thus when the level of the solution rises in tank 9, steam valve 12 is opened under control of level control 10 and solvent is pumped out of the tank. When the level of solution in tank 9 lowers, the reverse takes place. The pump delivers the solution to the filter press 13, from which the filtrate passes by pipe line 14 to the heat exchanger 15. The precipitate is discharged from the filter through valve 16. The filter 13 may be of any type capable of removing fine suspended particles which are not of a colloidal nature and which are not in solution in the menstruum being filtered.

In the heat exchanger 15, the solution is heated and is then delivered to the upper portion of the still 17. Still 17 contains a plurality of steam-heated trays with alternate distributing sections shown in greater detail in Figure 7. The solution enters the upper distributing section 18a and is discharged at the circumference over the serrated upturned vertical circumferential edge 19a. The solution thus discharged from the distributing section 18a is delivered around the circumference of the steam-heated tray 20a. The solution drains to the center of this tray and is discharged by the nipple 21a into the second distributing section 18b and continues in a like manner until it reaches the bottom of the still. In its passage over the heated trays, solvent is evaporated and the temperature of the solution increases as its concentration increases in its passage downward. The solution is heated only so long as it is in contact with the heated trays. Its time of contact with the heating means is therefore of relatively short duration. Furthermore, the heating is done with the solution in thin flowing films. This has two advantages.

1. It prevents overheating, as the solution in thin films will tend to uniformly maintain the temperature corresponding with the pressure in the still and the concentration of the solution at the instant.

2. The use of the thin films tends to limit any priming or foaming. Priming or foaming is not to be expected in the upper portion of the still, due to the relatively low concentration of the solution in the upper portions of the still. Any bubbles formed in the lower portion of the still will tend to be broken up before they reach the vapor outlet 22.

The concentrated solution from the lowest heating tray 18n is discharged to a pool 23 at the bottom of the still where it is out of contact with further heat. The level of this pool 23 is controlled by the level control valve 24, which maintains proper level in the pool by opening when a predetermined upper level is reached and closing when a predetermined lower level is reached. The amount of heating of the solution is controlled by the thermostatic valve 25 which admits heating medium to the upper heating tray 20a. This thermostatic valve is controlled by the thermostat 26 in the pool 23.

The material entering the still at the upper distributing section 18a is of course a solution of the extracted oil and this solution will have a relatively large amount of solvent of low boiling point. The vapor tension and vapor pressure of this solution at any temperature thus depend upon the mol percent of the solute and solvent in the solution, and the temperature of the solution. At any particular temperature, then, the vapor pressure and vapor tension will be at a maximum for the maximum mol percent of the low boiling component in the solution.

Conversely, if the pressure is substantially fixed, as it is in still 17 by its connection with condenser 30, the temperature of the solution is a minimum with the maximum concentration of the low boiling component of the solution. Thus any attempt to add an increment of heat to the solution results primarily in vaporizing a portion of the solution. Thus the increment of heat so added appears largely as latent heat of vaporization and does not act to raise the temperature of the solution except as the vaporization acts to increase the concentration of the high boiling component of the solution.

As the concentration of the high boiling component increases progressively as the solution passes down the still and as the maximum concentration of the high boiling component is at the bottom of the still, the maximum temperature of the solution within the still will be at this location. Accordingly, I place the control of the heating medium at this location in order to accurately limit the maximum temperature of the solution.

Figures 5, 6, 7:
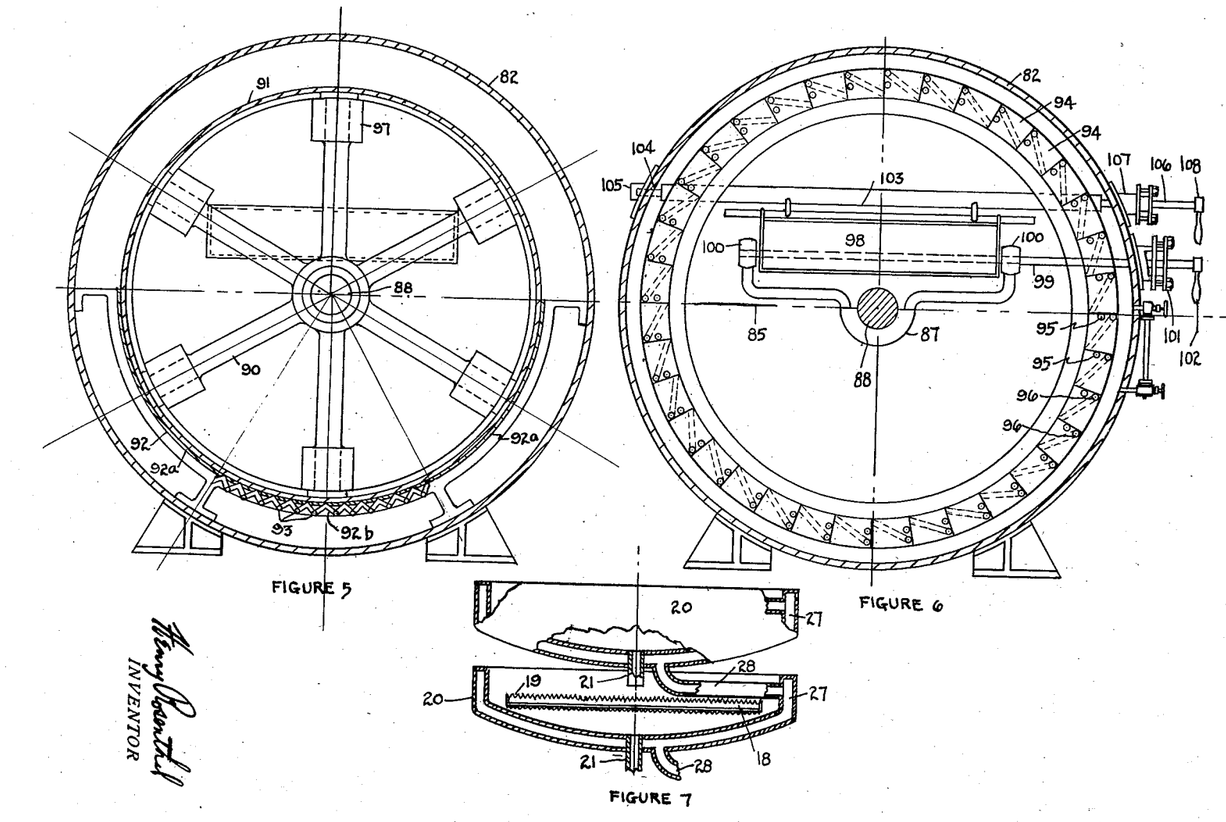
Figure 5 is a section of Figure 4 on line AA.
Figure 6 is a section of Figure 4 on line BB.
Figure 7 shows certain details of distilling apparatus shown in diagram in Figure 1.

Each heating tray, in order to easily withstand the pressures within the still, is composed of two dished heads joined together by any suitable means such as welding, forming together a chamber 27 as shown in Figure 7, into which the heating medium is admitted. The heating medium passing through valve 25 enters the space 27a of the upper tray near the circumference and is discharged near the center of the tray by pipe 28a to the interior space 27b of the next lowest tray 20b and so continues down the still until it is discharged through pipe 29.

Vapor from the still 17 passes through pipe 22 to the condenser 30 where it is condensed and delivered to the solvent tank 31. The pressure in still 17 is controlled by the pressure in condenser 30, which in turn depends upon the efficiency of the condenser, the temperature of the cooling water and the vapor pressure of the solvent. Where butane is used as a solvent, the pressure will in general be between 15 and 50 pounds per square inch gage, while with propane as the solvent the pressure will be in general between 50 pounds and 200 pounds per square inch gage. As the pressure of the still 17 is controlled entirely by the condenser pressure, all vapors leaving the still leave at a pressure at which they are condensable without compression. The temperature of the solvent in condenser 30 may be above that of storage tank 5 and extractor 1. The pressure maintained in the condenser may, therefore, be in excess of the pressure in the extractor. Pump 11 is provided to discharge the solution from the extractor through the filter 13 into the still 17 against such excess pressure as may exist.

The solution leaving the still 17 through the level control valve 24 will have been freed from the principal amount of solvent and substantially all the solvent will have been removed from still 17 that can be removed at the pressure of the condenser without exceeding limits of temperature which are controlled by the nature of the material being treated. This solution is discharged into the still 32. Still 32 is controlled at some predetermined pressure by means of the exhauster-compressor 33 which removes the vapors from still 32 as fast as they are generated and discharges them at condenser pressure either through valve 34 to condenser 30 where they are condensed along with the vapors from still 17, or through valve 35 to condenser 36 from which the condensed solvent is discharged to the solvent tank 31. The suction pressure of the exhauster-compressor 33 is maintained at any predetermined value by the control valve 37 which controls the supply of power to the compressor and is actuated by the pressure in the suction line to the compressor. I prefer that the pressure in still 32 be maintained at substantially atmospheric pressure by this means.

In the extraction of certain oils some of the mucilaginous materials are partially soluble in the solvent. Such portions as are soluble are therefore not removed by the filter 13 and will therefore be precipitated in the still 17. Where such soluble mucilaginous materials are present in sufficient amounts to be objectionable to the latter stages of the process they may be removed by filtering means 38 after leaving the still 17 while the product still contains a certain amount of the solvent which aids in lowering the viscosity of the oil and thus acts to aid the rate of filtering.

The solution entering still 32 will be concentrated to such an extent that where the oil has a tendency to prime or foam, this tendency will be at a maximum due to the fact that enough solvent has been removed to materially increase the viscosity of the solution and that there still remains sufficient solvent so that its vapors will be present in such quantities as to form large and persistent bubbles. To prevent these bubbles from being carried with the vapor, I provide paddles 39 above the level of the solution in the still.

These paddles are operated by the motor 40 at sufficient speed to break the bubbles, as the paddles in rotation impinge against them. Also driven by the motor 40 is the mechanical stirrer 41 immersed within the oil bath. This stirrer aids in the removal of the vapor from the solution by mechanically dislodging the bubbles of vapor from the solution as they are formed and preventing the head of liquid in the bottom of the still from acting to keep such bubbles in the solution.

The still 32 is provided with the heating jacket 42. Heating medium, such as steam, is admitted within this jacket by means of thermostatic valve 43 controlled by thermostat 44 within the still. The temperature of the oil in still 32 can thus be maintained at any predetermined value as described hereinbefore in connection with still 17.

Still 32 should be of such size that the solution, in passing through it, is not maintained within the still and subject to the temperatures of the still any longer than is necessary for the removal of all but a very small percentage of solvent. A still of a size that, with normal flow of solution to and from the still, will hold the solution for less than fifteen minutes to one-half hour will generally be of proper size. The solution enters the still from the top and is discharged from the bottom through level control 46 to maintain a predetermined level of liquid in the still.

Certain oils, such as soy bean oil and lard, usually contain a very low content of free fatty acid and therefore, for many uses, refining with caustic is unnecessary with such materials. I have found that certain of these materials produce a light colored oil when extracted by my method without the use of a clarifying or bleaching agent. With other materials, it is sometimes desirable to bleach the material in order to secure a product of high quality. I provide means for doing this. Tank 47, equipped with agitator 48, driven by the motor 49, may thus contain a suspension of fuller's earth or activated carbon in some of the oil extracted in my process. Tank 47 is equalized in pressure with still 32 through pipe 50, and its flow is controlled along with the flow of liquid from the still 32 by means of level control 46 operating on the level control valve 51.

The liquid from tank 47 is thus mixed with the liquid discharge from still 32. As the liquid leaves still 32, it contains small amounts of solvent. This liquid is discharged by the pressure of still 32 into the vacuum still 52. This still is equipped with a motor driven stirrer and heating jacket in the same manner as still 32, and where necessary may be provided with rotating paddles above the level of the liquid in the same manner as still 32. In addition, still 52 is equipped with a coil 53 having perforation 54 by means of which superheat steam may be admitted to the bath of oil at the bottom of the still. Still 52 is preferably maintained at a vacuum of from 24 to 28 inches mercury by means of the condenser 55 and the exhauster-compressor 56. The temperature of the oil in the still 52 is controlled by thermostatic valve 57 which is actuated by the thermostat 58. Where open steam is used in coil 53, the temperature of the oil must be very closely controlled by means of thermostatic valve 57 as the temperature of the oil must be sufficiently high to prevent condensation of the steam in the oil bath. While on the other hand, the temperature must be sufficiently low to prevent deterioration in the oil. The minimum temperature will, to an appreciable extent be governed by the vacuum maintained by condenser 55 and exhauster-compressor 56. With proper agitation of the bath, with temperatures of the oil not exceeding 200° F. and a vacuum of 26 inches of mercury, a complete removal of solvent may be obtained with only moderate use of open steam when either propane or butane is the solvent. In fact, I have found that the open steam is not necessary in some cases to affect the solvent removal, but it should be available as a precautionary measure.

Condenser 55, operated at the pressure of still 52, is for the purpose of condensing the open steam added through coil 53. The vapors of solvent containing some moisture are withdrawn from this condenser by means of the exhauster 56, which is operated to control the vacuum in the condenser at any predetermined value. This control is effected by control valve 59 regulating the supply of power to the exhauster and actuated by the pressure in the suction line to the exhauster. The amount of solvent vapors handled by exhauster 56 will be of insignificant amount when considered from the standpoint of their cost. They may, therefore, be discharged from the system through valve 60 at substantially atmospheric pressure or they may be discharged through valve 61 to condenser 62 from which they are delivered through solvent tank 31 to separator 63, which separator is provided to separate the water condensed along with the vapor in condenser 62. This water is drawn off periodically through valve 64.

The oil is removed from still 52 by means of the pump 65, the operation of which is controlled by valve 66, actuated by the level control 67. In this manner a predetermined level of liquid is maintained in still 52. The oil pumped from still 52 is discharged through heat exchanger 15, oil cooler 69 to the oil storage tank 70. Where the oil discharged from still 52 is not clear and brilliant, it may be passed through filter 68 before being cooled in the heat exchanger 15 and the cooler 69.

The solvent from tank 31 is returned to the storage tank 5 by means of the pump 71. This pump maintains a predetermined level of liquid in tank 31 by means of the control valve 72 and the level control 73.

The solvent in tank 5 is preferably held within a predetermined range of temperature, this range depending upon the material being extracted and the quality of product desired. Thermostat 74 within the storage tank controls thermostatic valves 75 and 76. Valve 75 controls the compressor 77 and allows the compressor to operate and withdraw solvent vapors from the storage tank when the temperature of the solvent reaches the predetermined upper level. The solvent is thus cooled by evaporation and the vapors drawn off are compressed, condensed in condenser 78, and returned to the storage tank 5. If the extraction is being conducted at a temperature in excess of atmospheric temperature, thermostatic valve 76 is opened when the solvent reaches a predetermined minimum value and heating medium is admitted to coil 79.

Now referring more specifically to Figures 2, 3, 4, 5 and 6, the details of the extractor proper will be explained.

The solid materials entering through the rotary valve 4 are discharged to the feed compartment 3, which is maintained at substantially atmospheric pressure by means of the outlet pipe 80 which connects with the vapor recovery system 81 (see Figure 1). Feed compartment 3 will contain a certain amount of vapor which is admitted from the extractor through rotary valve 2 and a certain amount of air which is admitted into the interstices of the solid charge admitted through rotary valve 4. The outlet pipe 80 should connect with compartment 3 at a point adjacent to the top of the compartment. In this way, the vapors coming from valve 2 must pass through the bed of solid charge before being led off to the vapor recovery system. Thus, a large portion of the vapors admitted to the inlet compartment 3 will be condensed and absorbed by the charge of solids and will be fed back directly to the extractor and will thus not have to be recovered in the vapor recovery system.

The vapor recovery system 81 may be any well known type and may utilize either the principle of liquid absorption, or the principle of solid absorption. However, I prefer that liquid absorption be used and that the absorption medium be devolatilized oil produced in the extraction system. This oil after being used to absorb the solvent vapors may be returned to the main extractor system either through still 17 or still 32.

The extractor, a stationary horizontal cylindrical shell 82 with dished heads 83 and 84, is divided into a number of compartments 85a, 85b, etc., in which the meal is contacted with the solvent. Each compartment is formed by the cylindrical shell of the extractor and a pair of diaphragms in the lower half of the extractor. These diaphragms are illustrated at 86a, 86b, etc. The diaphragms 86a and 86b, together with the shell, form compartment 85a.

As shown in Figure 6, each diaphragm has on its upper portion a bearing 87a, 87b, etc., supporting the shaft 88 which extends through the extractor head 83. The opening, through which the shaft extends, is sealed by means of the stuffing box 89, mounted on head 83. Within each compartment 85 and supported from shaft 88 by means of the spiders 90 there is a rotating cylinder 91 (Figure 5). This cylinder is composed of perforated metal of suitable size to support the solid material being extracted. This cylinder has a smooth exterior so that on rotation it can fit snugly against a semi-circular diaphragm lying in the lower half of compartment 85. This diaphragm 92 shown in cross section in Figure 5 is composed of three segments. The two outer segments 92a constructed of a solid sheet of metal will prevent free flow of liquid from the cylinder 91 into the annular space between the cylinders 91 and 82. The lower portion, 92b of the diaphragm, however, is a corrugated sheet on which cylinder 91 rests only on the upper edges, thus allowing the liquid to pass freely through the perforations of cylinder 91 down into the troughs formed by the corrugations. Here the solution is drained down the holes 93, from which it passes into the annular space between cylinders 91 and 82.

On the spider 90, adjacent to the point at which the spider is sealed against the vertical diaphragms 86, are series of buckets 94. These buckets rotate with the cylinder 91 and are located in the annular space between this cylinder and the extractor cylinder 82. Each bucket is equipped with a discharge pipe 95 and an inlet pipe 96 (Figure 6). Also mounted on the spider, but on the inside of cylinder 91, are the vanes 97 which rotate with the spider and effect the movement of the solid material. On each of the vertical diaphragms is the deflector vane 98a, 98b, etc. These vanes are mounted on shafts 99a, 99b, etc. mounted in trunnions supported by the main bearing 87. Shaft 99 is placed between the rotating cylinders and extends through the extractor shell 82 by means of the stuffing box 101. The shaft is equipped with a handle 102 by means of which it can be rotated and the positions of the vane 98 may be adjusted thereby. Also between the cylinders 91 and mounted above the vane 98 is the trough 103 supporting the pipe 104 with the spray head 105. Trough 103 is provided with a shaft at either end, one shaft 104 being mounted on the bearing 105 fixed from the cylinder 82. The shaft 106 at the other end, passing through stuffing box 107, is equipped with handle 108. By means of this handle the position of the trough can be adjusted. In addition to the compartments 85a, 85b, etc., in which are mounted the rotating cylinders 91a, 91b etc., there is a compartment at either end of the extractor. Compartment 109 (Figure 4) serves to retain the solution which is about to be discharged from the extractor. This solution enters compartment 109 through the series of holes 110 in diaphragm 86a. In this compartment 109, mounted on the shaft 88, are the paddles 111. Pressure tank 112 with rotary valve 113 delivers into (see Figure 2) compartment 109 by means of pipe 114. This tank may be used to hold a suspension of filter aid which on delivery to compartment 109 is incorporated by means of the paddles 111 with the solution in the compartment.

At the other end of the extractor is compartment 115 with the paddles 116 mounted on the shaft 88. Compartment 115 has a bottom opening entering upon the conveyor chamber 117 containing the screw conveyor 118. The paddles 116 are provided to deliver the extracted solid materials into this opening.

Conveyor chamber 117 is provided with a heating jacket 119. Heating medium is admitted through this chamber by means of the thermostatic valve 120 (see Figure 1) operated by the thermostat 121 in the conveyor compartment at a point where the spent meal is discharged from the conveyor into the rotary valve 122. Rotary valve 122 serves to discharge the meal into the discharge compartment 123 which is maintained under high vacuum by suction applied through the pipe 124 which preferably leaves through valve 125 to the vapor recovery system 81 (Figure 1). Meal is discharged from the discharge compartment 123 by means of the rotary valve 126 (Figure 2).

Motor 127 (Figure 3), through proper gearing, operates the shaft 88 of the extractor as well as the rotary valve 2, 4, 122, 126 and 113. Clutches 128, 129, etc., are provided so that the rotation of the various units can be controlled independently for stopping and starting of the unit. However, while in continuous operation, the entire operation may be synchronized by providing suitable ratio between the various units.

Solids are fed on to the deflector vane 98a from which they are deflected into the first compartment 85a. Vanes 97 mounted on rotating cylinder 91a carry these solids forward through the solvent in the compartment and they are finally discharged on to the deflector 98b from which they are delivered to the second compartment of the extractor. This operation is repeated in the second compartment and is continued through as many stages as are necessary to complete the extraction. As shown in Figure 2, there are four extracting compartments 85a, 85b, 85c and 85d. The solids from 85d are carried into compartment 85e to which no solvent is fed so that in this compartment the solid material is freed from liquid by draining. The drained solids are then carried forward to compartment 115 where the paddles 116 act to push the solids into the conveyor chamber 117. The conveyor carries the solids through the heated conveyor chamber to the rotary discharge valve 122. As the conveyor chamber and the extractor compartments are in open communication and at the same pressure, little increase in temperature of the meal in the conveyor chamber is necessary to effect complete vaporization of the solvent. The addition of the heat necessary to supply the heat of vaporization can therefore be closely controlled by the thermostat 121.

It will be noted that the vanes 97 which move the meal within a single extractor compartment, act to lift the solid material from the bottom of the bath and carry it upward through the solvent in the compartment, to which solvent is delivered to the top of the bath and is discharged from the bottom of the bath. This general upward movement of the meal is most pronounced at the point where the solid is being discharged from the one compartment to the next. There is thus a down-flow of solvent and an up-flow of solid as the solids are being discharged.

Fresh solution is fed into the extractor into the second section before the solid is discharged. Thus, as shown in Figure 2, it is fed in the compartment 85d. The solution in passing through the bed of solid, extracts the oil therefrom and passes out of the rotating cylinder containing the solid material into the annular space which surrounds the rotating cylinder. The buckets provided around the outside circumference of the rotating cylinder pick up the solution in the bottom of the annular space and lift it so that it may be discharged into the trough 103 and so into the next compartment in a direction counter-flow to that of the solid material. The flow of liquid from one compartment to another may be adjusted by changing the position of the trough 103 with its connecting pipe and nozzle. If the trough is tilted toward the compartment from which the liquid is being lifted, a portion of the liquid will flow back into that compartment. If tilted in the opposite direction, all of the solution will be delivered to the next forward compartment. In this way the flow of liquid and the height of the solution in each compartment can be adjusted. I prefer to operate with a solution level in each compartment, somewhat below the bottom of the shaft by which the cylinders are supported and turned.

In a like manner the deflector vanes 98 may be tilted and the movement of the solid material through the extractor can be controlled and the level of solid in each of the compartments adjusted. I prefer that the level of solids be maintained just below the center line of the extractor.

As has previously been mentioned, the last rotating cylindrical compartment before the discharge of the meal is operated with no solution flowing thereto. The movement of meal through this compartment over the perforated metal shell of the rotating cylinder permits the meal to be drained of all extraneous solvent before it is delivered to the heated screw conveyor by means of the paddle in the end compartment of the extractor cylinder from which the solids are delivered. The rotating cylindrical compartment in which the solvent is drained from the solids is equipped with a series of buckets for lifting the solvent from below the cylinder in the same manner as the other rotating cylinders. These buckets keep the level of the solvent in this compartment below the level of the bottom of the rotating screen and deliver the solvent drained through the screen into the adjacent rotating cylinder along with the fresh solvent being delivered to the extractor.

The spent meal, as it enters the screw conveyor, is thus relatively dry. In this conveyor sufficient heat is added to completely vaporize the solvent which remains in the meal. A substantial portion of the vapors thus generated condense in the solution within the extractor cylinder, but a portion of the solvent vapors remain with the meal at extractor pressure. The amount of heat added while the meal passes through the conveyor must be sufficient to supply the latent heat of vaporization of the entrained liquid solvent, to slightly raise the temperature of the meal and to somewhat superheat the solvent vapor. Where propane and butane or similar low boiling hydrocarbons are used as solvents, the temperature at which the heat is added and to which the meal and vapors must be heated is low and need not exceed 130° F. The heating stage for solvent removal from the meal is therefore low. Furthermore, the meal is heated out of contact with air or oxygen. Thus, in the handling of either vegetable or animal material, the proteins contained therein are neither converted by heat nor oxidized by air and a meal of high quality containing less than 2% of oily matter is produced.

The meal, as it is discharged from the heating conveyor into the rotary valve, is accompanied by an amount of solvent vapors in the interstices of the meal. This vapor may be removed by reduction in pressure. This is especially true when low boiling hydrocarbons, which have the property of superheating on expansion, are used as solvents. There is thus no tendency for recondensation when the meal with its entrained vapor passes from the conveyor at extractor pressure through the rotary valve to the discharge chamber where low pressure is maintained. The pressure maintained in the discharge chamber should be less than half of atmosphere, and I prefer that it be from 24 to 28 inches of mercury. This reduced pressure may be maintained by any well known means. I prefer that the solvents removed from the discharge chamber be delivered to a solvent recovery system, preferably of the oil absorption type, and that the recovered solvent be returned to the extractor system.

In the preceding, I have described the details of an oil extraction and separation system. It will be obvious that numerous products may be treated in my system for extracting oils, and that numerous oils in solution may be separated in accordance with my invention, the physical conditions being varied in accordance with the product being treated.

In my copending applications filed of even date relating to Methods and products of cotton seed extraction, Serial Number 738,402; Method and products of extracting animal oil, Serial Number 738,403, and Coffee and the treatment thereof, Serial Number 738,404, now Patent Number 2,123,207, I have disclosed certain specific applications of my invention although it will be understood that it may equally well be applied to the numerous other edible extracted oils.

In my copending application filed of even date relating to Extraction of oil shale, Serial Number 738,405, I have disclosed application of the extractor described and claimed in this application to a specific petroleum oil, but it will be understood that the invention is equally applicable to the extraction and separation of petroleum soaked sands and similar materials.

Thus it will be understood that the invention may be applied to extraction of many products and that the refining of oils generally may be carried on in accordance with the principles of my invention, and I do not intend to limit myself except as set forth in the appended claims

I claim:

1. In a system of continuous extraction, a closed extractor having a plurality of substantially horizontal perforated cylindrical compartments, an adjustable deflector positioned between adjacent compartments, each compartment being provided with a series of blades attached to the inner circumference of said cylinder, said blades being adapted to raise solid material lying within said cylindrical compartment to propel said solid material longitudinally of said compartment, and finally to raise said solid material and discharge same to said adjustable deflector from which said solid material is discharged to an adjacent cylindrical compartment, and means on the exterior of said closed extractor for controlling said adjustable deflector within said extractor.

2. In a system of continuous extraction, a substantially horizontal extractor having a plurality of perforated cylindrical rotatable compartments each compartment being provided at one end with a series of buckets attached to the outer circumference of said cylinder and rotatable with same, said buckets being adapted to raise solution from a space within the extractor below said cylinder and deliver said liquid to a trough placed transversely of said extractor and mounted externally of said cylindrical compartment, and means for delivering said solution from said trough to the adjacent cylindrical compartment.

3. In a system of continuous extraction, a substantially horizontal extractor provided with a plurality of diaphragms forming compartments within said extractor, a plurality of perforated cylinders rotatable within said compartment, means for moving a bed of solid material contained within said rotating cylinders, means secured to the exterior of said cylinders and operable with said cylinders for moving solution contained within said compartments, adjustable deflectors mounted above said diaphragms and means for elevating said solid material above said deflectors, whereby the flow of solid material from one compartment to an adjacent compartment may be controlled, and troughs mounted above said diaphragms whereby the flow of solution from one compartment to an adjacent compartment may be controlled.

4. In a system of continuous extraction, a substantially horizontal extractor provided with a plurality of cylindrical rotatable compartments, means for delivering solution from one of said compartments to an adjacent compartment, a separate stationary end compartment into which the solution about to be discharged from said extractor is delivered, means for delivering solution from a rotatable compartment to said end compartment, means in communication with said end compartment for delivering a filter-aid to the solution contained in said compartment, and means within said compartment rotatable with said rotatable compartments for mixing said filter-aid into said solution.

5. In a system of continuous extraction, means for charging solid material to an extractor operating at superatmospheric pressure, said means comprising a chamber sealed at either end by means of a substantially tight displacement valve adapted to form a closure while delivering solids and provided with a vapor outlet near the upper portion of said chamber for the eduction of solvent vapors from the sealed space, means in communication with said vapor outlet for removing and compressing vapors, whereby solvent vapors carried from the extractor into said chamber are passed through the solid material in said chamber before being discharged and a portion of said vapors are absorbed in said solid material and returned to said extractor, and whereby the pressure in said chamber is maintained at some predetermined value.

6. A continuous extractor comprising a horizontal stationary cylindrical shell capable of withstanding superatmospheric pressure, a plurality of vertical diaphragms dividing said shell into a plurality of interior compartments, semi-circular horizontal diaphragms in the lower portion of center interior compartments, said horizontal diaphragms being smooth on their upper portions and corrugated on their lower portions, a horizontal rotatable shaft supported by said vertical diaphragms and carrying a plurality of horizontal perforated cylindrical shells so mounted that their circumferences are substantially in contact with said horizontal diaphragms, means for admitting solids to the interior of the extractor, means for advancing said solids through the extractor, means for discharging said solids from the extractor, and means for admitting solvent to the extractor and removing solution from the extractor.

7. In a continuous extraction system, an extractor comprising a sealed inlet chamber, an elutriation zone having a plurality of rotating chambers, a chamber for vaporizing solvent associated with the spent meal, said latter chamber consisting of a screw rotating in a heated cylinder connected with the elutriation zone in a manner that the vapors released from the meal having a lesser amount of solvent pass through the meal having a greater amount of solvent and are discharged from the vaporizing chamber into the elutriation zone, a sealed outlet chamber, and connections for admission of solvent to the extractor and for discharge of solution from the extractor.

8. The method of continuous extraction of oleaginous substances which comprises contacting oleaginous and protein containing solid material with a liquid hydrocarbon solvent, that is gaseous at normal temperature and pressure, under superatmospheric pressure at which said solvent is maintained in liquid state, to dissolve the oleaginous substances; withdrawing the solution so formed from the remaining solid material; and substantially completely evaporating the solvent under superatmospheric pressure and at a temperature of the order of 130° F. from the protein containing solid remaining after extraction, while maintaining the substantially oil-free protein residue in an atmosphere of solvent vapor substantially free from moisture.

HENRY ROSENTHAL.